O. DREIBRODT.
METHOD OF AND APPARATUS FOR FORMING LARGE CRYSTALS.
APPLICATION FILED JUNE 27, 1914. RENEWED FEB. 6, 1920.
1,353,571.
Patented Sept. 21, 1920.
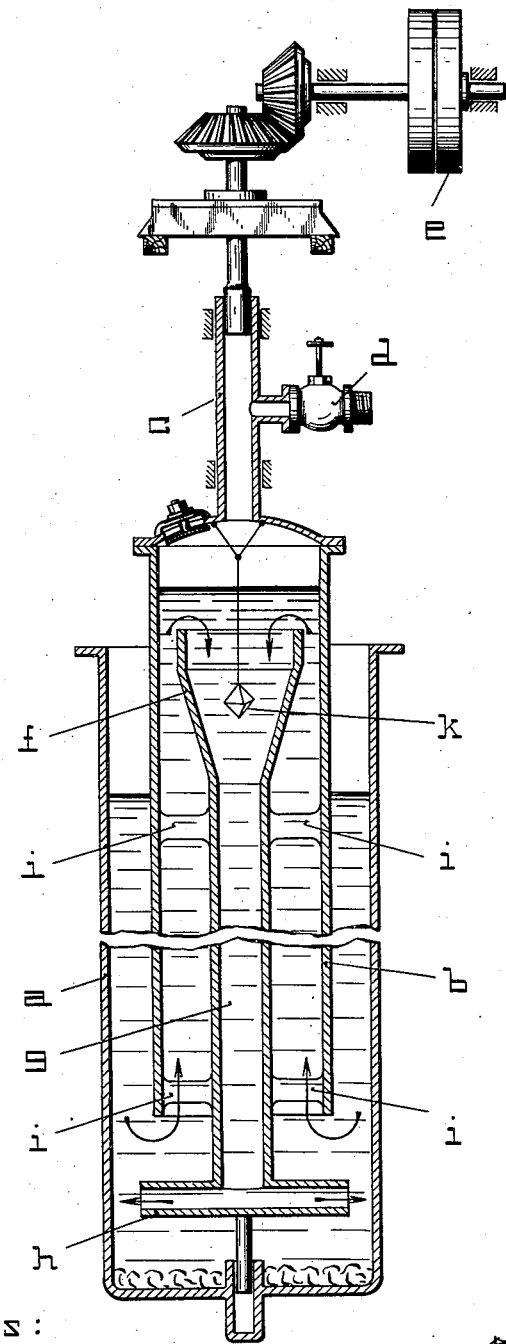

UNITED STATES PATENT OFFICE.

OTTO DREIBRODT, OF BITTERFELD, GERMANY, ASSIGNOR TO ELEKTROCHEMISCHE WERKE, G. M. B. H., A CORPORATION OF GERMANY.

METHOD OF AND APPARATUS FOR FORMING LARGE CRYSTALS.

1,353,571.     Specification of Letters Patent.     Patented Sept. 21, 1920.

Application filed June 27, 1914, Serial No. 847,787. Renewed February 6, 1920. Serial No. 356,799.

*To all whom it may concern:*

Be it known that I, Dr. Phil. OTTO DREIBRODT, a subject of the Duke of Anhalt, residing at Bitterfeld, Germany, have invented certain new and useful Improvements in Methods of and Apparatus for Forming Large Crystals, of which the following is a specification.

As is known, it is possible to form into crystals large quantities of saturated solutions by crystallization in movement. A simple method of effecting crystallization in movement consists in causing the saturated solution to flow through a long channel and in returning the solution discharged to the top end of the channel by means of a pump. In accordance with another method, a vertical tube open at the bottom is arranged in the crystallizing tank, the closed end of this tube located above the liquid carrying a series of distributing tubes arranged starwise. Compressed air is admitted to the tube from below, whereby the liquid to be crystallized is forced through the distributing tubes, thus producing a circulation of the solution. It is true that speedy crystallization is obtained in this manner, but the crystals constitute a continuous crust and are therefore badly formed.

It is also known in crystallization apparatus to cause the liquid to be crystallized to circulate between a solution vessel and a crystallization chamber.

The present invention has for its object a method which is not merely of advantage for effecting speedy crystallization but also for furnishing large and well formed crystals. With this object an apparatus is employed in which a special crystallizing chamber is arranged over the vessel containing a saturated solution or a molten substance. The solution is displaced upward from the lower vessel mechanically and at a velocity capable of variation and then under the influence of gravity, it flows back through a tube into the solution vessel. Now if one or more crystals for inducing crystallization be arranged in the crystallizing chamber, the solution continuously circulates over them and the crystal quickly grows. Owing to the speed with which the solution moves, any freshly formed crystals cannot adhere to the crystals originally provided in the apparatus so that they cannot impede the crystal growth. The temperature, which must be somewhat lower in the crystallizing chamber than in the solution vessel, can be closely adjusted by increasing or decreasing the difference of level between the two vessels.

A form of apparatus for carrying this method into practice is illustrated by way of example in the accompanying drawing.

The solution with the substance to be dissolved is placed in the vessel $a$, which is adapted to be heated or cooled. A tube $b$ open at its lower end extends into this vessel; at its upper part, this tube is reduced at $c$ and closed. A lateral orifice $d$ provided with a cock is fitted to the reduced tubular portion $c$ and communicates with a suction pipe. This reduced portion $c$ also carries a gear meshing with a gear secured to a shaft carrying belt pulleys $e$ for rotating the tube $b$. This rotatable tube $b$ is supported over the crystallizing chamber proper $f$, which by means of a long tube $g$ terminates beneath the opening of the tube $b$ in a T-piece $h$ open at both ends, but is rigidly connected with the tube $b$ by means of stays $i$.

In order to operate the apparatus, the solution is drawn from the vessel $a$ through the lateral orifice $d$ as far as the rim of the crystallizing chamber $f$. The cock in the suction socket $d$ is then closed, cutting off communication with the suction pipe. The tube $b$ with its rigidly connected internal elements, is caused to rotate or by means of a suitable eccentric, the tube $b$ may be caused to effect a movement which is reversed after each semi-rotation. If the motion is sufficiently rapid, the tube $b$ acts as a Witt agitator, that is to say the solution is drawn up in the tube $b$ and discharged through the tube $g$. In this manner a continuous circulation is insured so long as the apparatus is rotating.

By modifying the length of the arms of the T-piece $h$ and also the speed of rotation, the velocity of the circulation can be regulated as desired.

By immersing the apparatus to a greater or less depth into the solution vessel $a$, the difference of level and therefore the difference of temperature of the liquid to be crystallized between the crystallizing chamber and the solution vessel, can be modified at will. That is to say, the solution which is heated in, or before it is brought into, the container $a$, is cooled as it passes upwardly through the pipe $b$ by radiation from that part of this pipe which is exposed to the outside air; and the cooling operation is the greater, the more the pipe $b$ projects above the liquid level in the container $a$, since it provides a longer distance of travel of the liquid during which the cooling action by radiation and conduction takes place.

As illustrated in the drawing, by way of example, a crystal $k$ for inducing crystallization is suspended in the crystallizing chamber $f$.

The method and the apparatus can also be employed for crystallizing molten substances in the same way as for crystallizing from solutions.

In contradistinction to the known method, the heat supplied to the solution vessel is utilized for obtaining the temperature suitable for crystallization and all conduits outside the two vessels serving to connect them are dispensed with as such conduits readily give rise to the formation of undesirable crystals. Moreover, the appropriate difference of temperature between the solution vessel and the crystallizing chamber such as is necessary for the crystallization with the novel arrangement, can be obtained simply by raising and lowering the suction agitator and thereby providing a longer or shorter distance of travel of the liquid through that portion of the agitator which is exposed to the cooling action of the surrounding air.

As the solution vessel may have any convenient form including that of a melting pot and as the suction agitator is arranged directly in the solution vessel, it is readily possible by simple heating (in an electric furnace for example) of the melting pot to use the apparatus for molten substances which is not the case with the known crystallization apparatus.

Having described the invention, what I claim is:—

1. The herein described method of forming crystals from a saturated solution or molten substances which comprises circulating the liquid from a liquid-containing chamber to a crystallizing chamber containing a seed crystal, and thence back to the liquid-containing chamber with sufficient rapidity to prevent adherence of smaller crystals to the faces of the seed crystal, and cooling the liquid during its flow to the crystallizing chamber.

2. The herein described method of forming crystals from a saturated solution or molten substance which comprises circulating the liquid between a liquid-containing vessel and a crystallizing chamber containing a seed crystal, and varying the degree of loss of heat of the liquid during its flow from the liquid-containing chamber to the crystallizing chamber, and the temperature of the latter, by adjusting the relative positions of the crystallizing chamber and of the liquid-containing chamber and thereby exposing a greater surface of the liquid to the cooling action of the surrounding atmosphere.

3. The herein described method of forming crystals from a saturated solution or molten substance which comprises circulating the liquid between a liquid-containing vessel and a crystallizing chamber containing a seed crystal, and varying the degree of loss of heat of the liquid during its flow from the vessel to the chamber, and the temperature of the latter, by regulating the rate of flow of the circulating liquid and its exposure to the cooling action of the surrounding atmosphere.

4. In an apparatus for forming crystals, a vessel adapted to contain the liquid to be crystallized, a suction agitator extending within the vessel comprising a crystallization chamber, and means to turn the agitator relatively to the vessel.

5. In an apparatus for forming crystals, a vessel adapted to contain the liquid to be crystallized, a suction agitator extending within the vessel comprising an outer tube closed at its upper end and an open ended inner tube extending within and secured to the outer tube, and means to turn the agitator relatively to the vessel.

6. In an apparatus for forming crystals, a vessel adapted to contain the liquid to be crystallized, a suction agitator extending within the vessel comprising an outer tube closed at its upper end and an open ended inner tube extending within and secured to the outer tube, the upper end of the inner tube being enlarged to form a chamber, and means to turn the agitator relatively to the vessel.

7. In an apparatus for forming crystals, a vessel adapted to contain the liquid to be crystallized, a suction agitator extending within the vessel comprising an outer tube closed at its upper end and an open ended inner tube extending within and secured to the outer tube, the lower end of the inner tube being provided with outwardly extending hollow arms, and means to turn the agitator relatively to the vessel.

In witness whereof, I have hereunto set my hand this 16th day of June, 1914.

Dr. OTTO DREIBRODT.

Witnesses:
  Rudulph Fricke,
  Alice Dunger.